(12) United States Patent
Stapleton

(10) Patent No.: US 7,204,396 B1
(45) Date of Patent: Apr. 17, 2007

(54) ONE-PIECE SUPPORT WITH INTEGRATED RAIL ATTACHMENT MECHANISM AND INTERCHANGEABLE OUTER COVER

(75) Inventor: Craig Stapleton, St. Clair, MI (US)

(73) Assignee: Sportrack Automotive, Sterling Heights, MI (US)

( * ) Notice: Subject to any disclaimer, the term of this patent is extended or adjusted under 35 U.S.C. 154(b) by 373 days.

(21) Appl. No.: 10/621,682

(22) Filed: Jul. 17, 2003

Related U.S. Application Data

(60) Provisional application No. 60/396,772, filed on Jul. 18, 2002.

(51) Int. Cl.
*B60R 9/00* (2006.01)

(52) U.S. Cl. ............... 224/326; 224/309; 224/328; 410/77

(58) Field of Classification Search ............... 224/309, 224/321, 325, 326, 328; 410/77
See application file for complete search history.

(56) References Cited

U.S. PATENT DOCUMENTS

| | | | | |
|---|---|---|---|---|
| 4,269,339 A | * | 5/1981 | Bott | 224/325 |
| 4,279,368 A | * | 7/1981 | Kowalski | 224/326 |
| 4,341,332 A | * | 7/1982 | Kowalski et al. | 224/326 |
| 4,842,176 A | * | 6/1989 | Stapleton | 224/326 |
| 5,016,799 A | * | 5/1991 | Stapleton | 224/326 |
| 5,400,938 A | * | 3/1995 | Kolodziej et al. | 224/321 |
| 5,497,925 A | * | 3/1996 | Lumpe et al. | 224/326 |
| 5,553,761 A | * | 9/1996 | Audoire et al. | 224/321 |
| 5,617,981 A | * | 4/1997 | Ricker et al. | 224/309 |
| 5,622,298 A | * | 4/1997 | Cucheran et al. | 224/326 |
| 5,893,499 A | * | 4/1999 | Lumpe et al. | 224/309 |
| 6,378,747 B1 | * | 4/2002 | Fisch et al. | 224/326 |
| 6,729,513 B2 | * | 5/2004 | Kmita et al. | 224/320 |

* cited by examiner

*Primary Examiner*—Stephen K. Cronin

(57) ABSTRACT

A support assembly for use with a vehicle article carrier comprises a one-piece support having a base portion and a rail portion, a first attachment mechanism associated with the support, and a cover. The cover has a second attachment mechanism engaging the first attachment mechanism to secure the cover to the support.

18 Claims, 4 Drawing Sheets

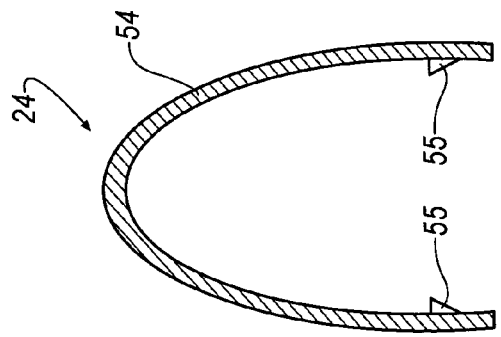
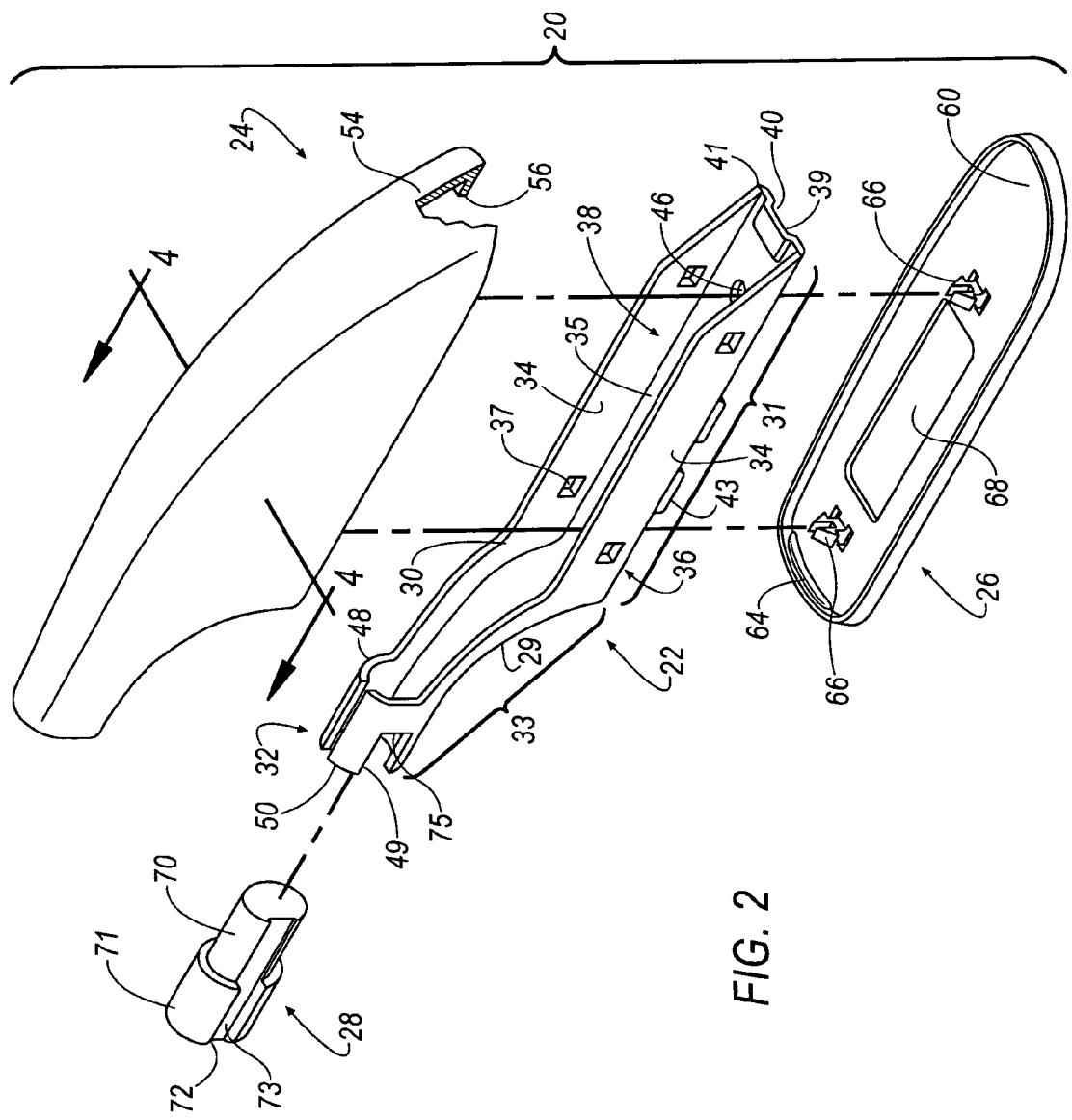

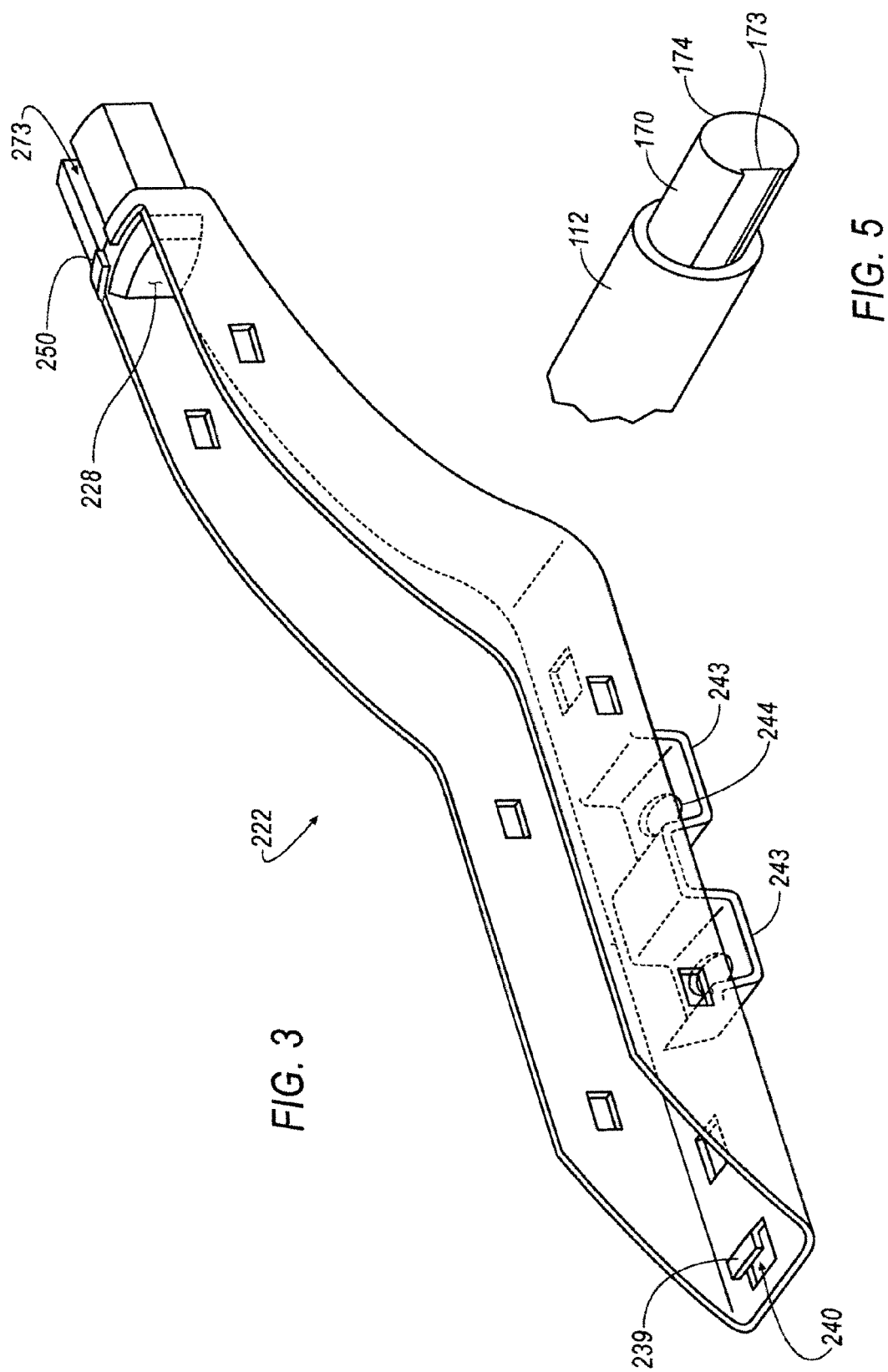

ONE-PIECE SUPPORT WITH INTEGRATED RAIL ATTACHMENT MECHANISM AND INTERCHANGEABLE OUTER COVER

CROSS REFERENCE TO RELATED APPLICATIONS

This application claims the benefit of U.S. Provisional Patent Application Ser. No. 60/396,772, filed on Jul. 18, 2002.

TECHNICAL FIELD

The present invention relates to article carriers for vehicles, and in particular to a support assembly for attaching carrier rails to a vehicle surface.

BACKGROUND

Passenger vehicles offered by manufacturers reflect the demands and preferences of the consumer public ranging from traditional automobile designs to trucks and variations thereof. Recent years have witnessed the dramatic expansion of utility vehicles such as mini-vans and sport utility vehicles. These vehicles often include carriers of one kind or another mounted externally to the vehicle for the purpose of carrying articles.

The vehicle surface to which the carrier is mounted may be a vehicle roof top, rear deck, cargo bed, or the like. An article carrier generally comprises an elevated frame comprising a variety of rails that is supported above the vehicle surface by a plurality of support assemblies that connect the frame to the vehicle. The support assemblies are usually unique to each make and model of vehicle, therefore requiring a large number of individual support designs. Unique designs generally result in increased production and inventory costs, thus adversely affecting the cost of the vehicle and replacement parts.

The desire to streamline production design and reduce inventory requirements of the various manufacturers makes the unique designs of the past undesirable. Therefore, there is a need in the industry for a support assembly structure that is generally interchangeable between vehicles while simultaneously adaptable to different aesthetic designs.

SUMMARY OF THE INVENTION

One aspect of the present invention is a support assembly for use with a vehicle article carrier. The support assembly comprises a one-piece support having a base portion and a rail portion, a first attachment mechanism associated with the support, and a cover. The cover has a second attachment mechanism engaging the first attachment mechanism to secure the cover to the support.

Another aspect of the present invention is a support for use with a vehicle article carrier. The support in combination with other like supports maintains at least one siderail or at least one crossrail in a spaced relationship from a surface of the vehicle. The support comprises at least two substantially parallel sidewalls and a web extending between and maintaining the sidewalls in a spaced apart relationship. A first end of the support defines a base portion and a second end of the support defines a rail portion.

Yet another aspect of the present invention is a support assembly for use with a vehicle article carrier. The support assembly comprises a one-piece support having a generally U-shaped cross-section. The U-shape is defined by sidewalls and a web extending therebetween. The support has a base portion and a rail portion wherein the web in the base portion has at least one pedestal extending from a bottom of the U-shape and defines at least one hole therethrough for affixing the support to the vehicle. The rail portion is generally angled with respect to the base portion such that an end opposite from the base portion is generally parallel to and spaced from the web of the base portion. The opposite end of the rail portion further includes ears. An adapter component is received in the opposite end of the rail portion and is at least partially retained by the ears and partially retained by the sidewalls and the web. A gasket is affixed to the bottom of the support, and a cover extends over the support and is engaged thereto.

These and other advantages of the invention will be further understood and appreciated by those skilled in the art by reference to the following written specification, claims and appended drawings.

BRIEF DESCRIPTION OF THE DRAWINGS

In the drawings:

FIG. 2 is an exploded perspective view of a support assembly of the present invention according to one embodiment of the invention.

FIG. 3 is another embodiment of the support and plug where the support is a metal stamping.

FIG. 4 is cross-section of a portion of a cover for the support assembly of FIG. 2.

FIG. 5 is a perspective view of a rail having an integral male insertion portion at an end thereof.

DETAILED DESCRIPTION OF THE PREFERRED EMBODIMENT

For purposes of description herein, the terms "upper", "lower", "left", "rear", "right", "front", "vertical", "horizontal", and derivatives thereof shall relate to the invention as oriented in FIG. 3. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
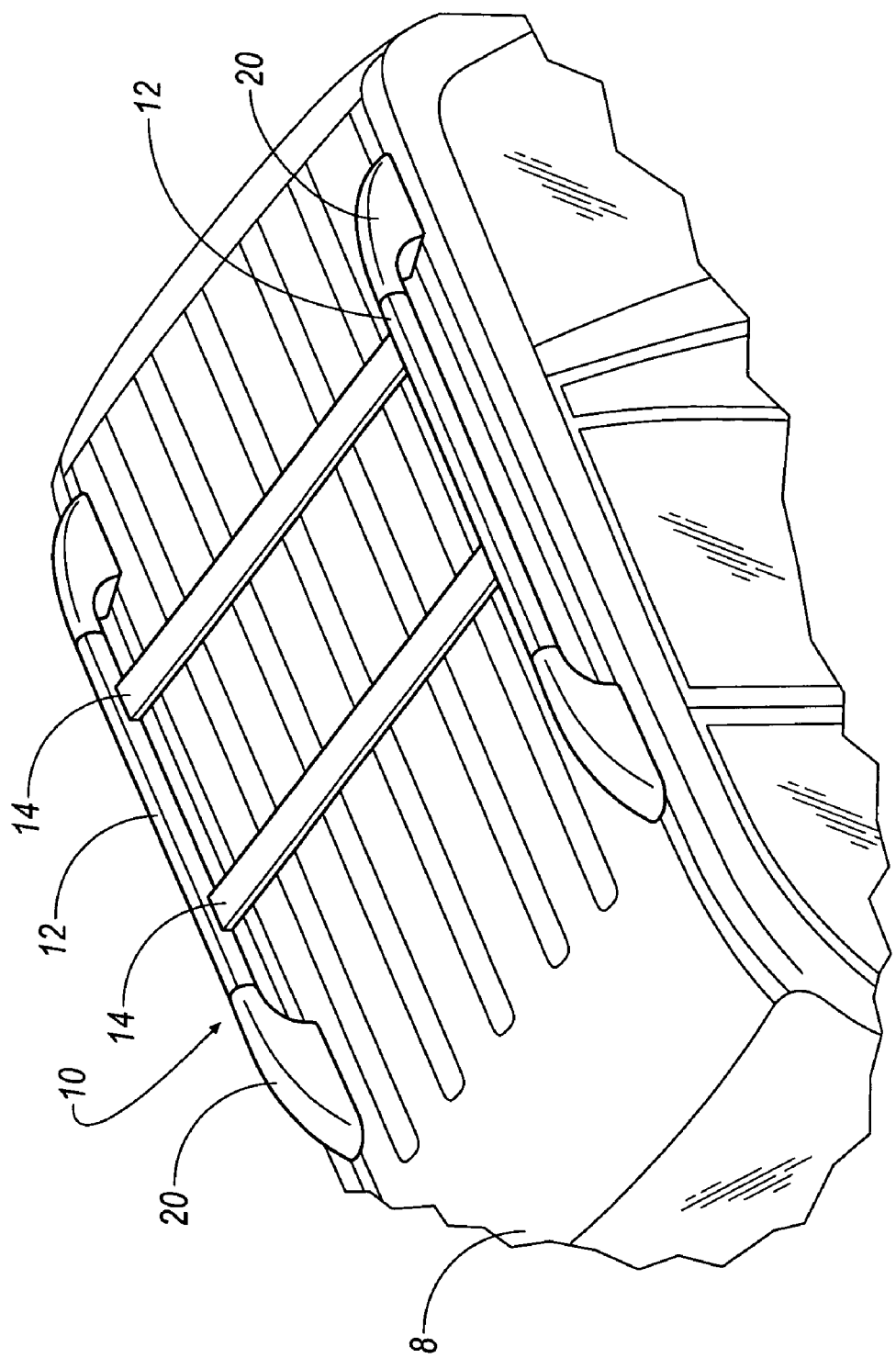
FIG. 1A is a perspective view of a first embodiment of the present invention showing present invention mounted to a vehicle surface.
Figure 1B:
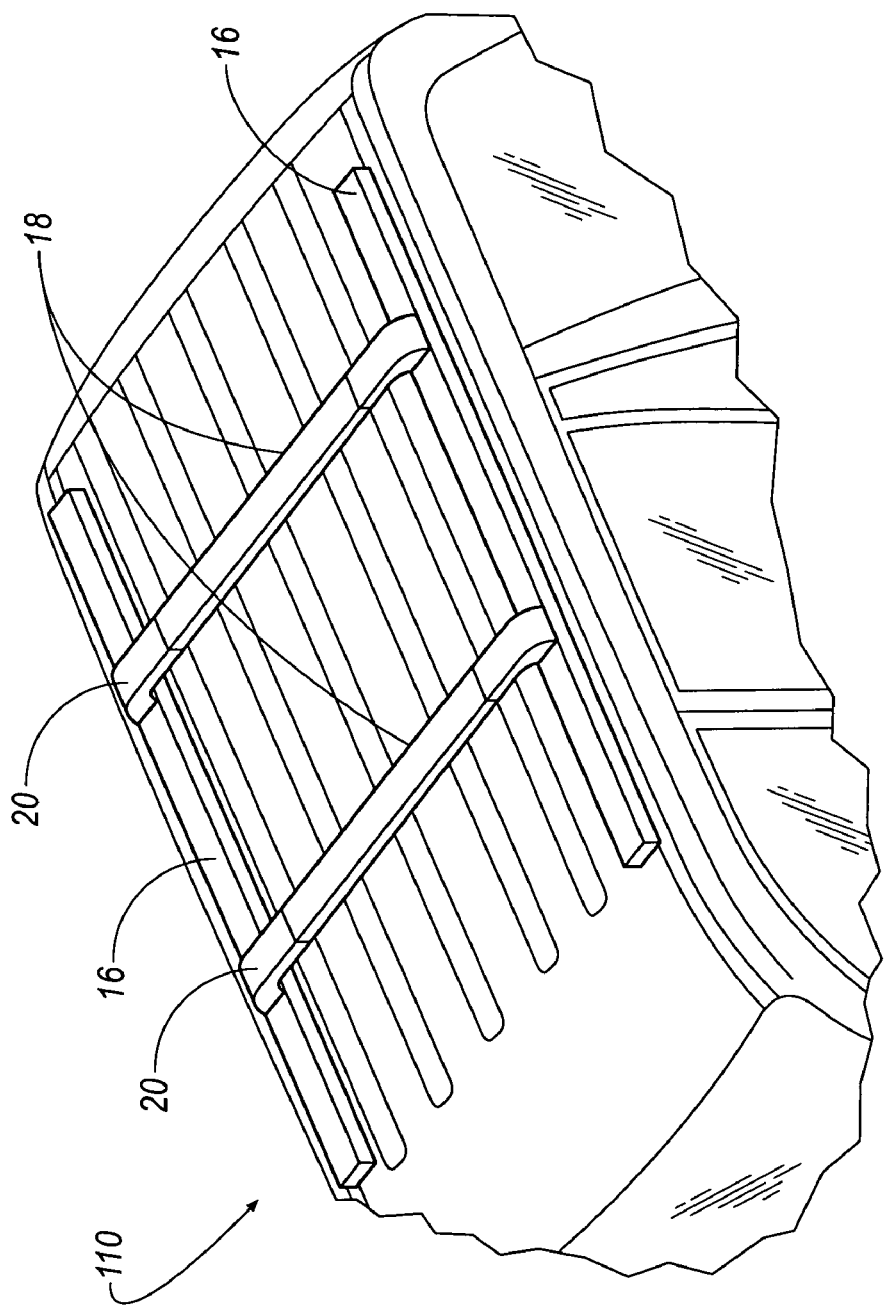
FIG. 1B is a perspective view of a second embodiment showing the present invention mounted on a track on a vehicle.

Turning to the drawings, FIG. 1A illustrates a vehicle 8 having a vehicle article carrier 10 mounted to a top of the vehicle. In one exemplary embodiment of a vehicle article carrier 10, carrier 10 includes a plurality of support assemblies 20 and a pair of side rails 12, which extend longitudinally between the support assemblies 20 and one or more cross rails 14 that extend transversely between the side rails. In another embodiment 110 as shown in FIG. 1B, a track 16 runs along a length of a vehicle surface, support assemblies 20 are movably received in the track 16 and a cross rail 18 extends between opposing support assemblies 20 to form the carrier 110.

FIGS. 2 and 4–5 illustrate support assembly 20, which is one of the preferred embodiments of the present invention. The support assembly 20 comprises a support 22, an interchangeable cover 24 being one of a variety of stylistic designs, a gasket 26 for environmental sealing between the support and the vehicle surface, and a plug adaptor 28 for connecting rail 14 to support 22. A single support 22 design may be used for all the support assemblies 20 of a particular carrier 10, reducing cost and providing uniformity. The same support 22 may also be used with a variety of different vehicles, the ability to have interchangeable covers 24 providing stylistic differentiation from vehicle to vehicle.

In one embodiment, the support is formed from a one-piece metallic construction such as an aluminum or steel stamping or as a die-cast construction. Alternatively, support 22 can be a very rigid resinous material and may include reinforcing fibers such as glass to provide appropriate strength and rigidity characteristics.

Support 22 is somewhat U-shaped in cross-section with two sidewalls 34 and a web 35 interposed therebetween to form a channel 38. Preferably, support 22 includes a base portion 31 adapted to be secured to a vehicle surface and an upper rail portion 33 at adapted to receive either a side rail 12 or a cross rail 18, depending on the environment in which the support assembly 20 is used. The base portion 31 extends generally parallel to the vehicle surface while the upper rail portion 33 is spaced away from the base portion such that a rail 12 or 18 to be secured to the rail portion 33 is remotely spaced from the vehicle surface. Typically, the rail portion 33 is somewhat angled with a first end 30 generally perpendicular to the base portion and a second end 32 generally parallel to the base portion with a curved portion 29 disposed between the two ends, providing a transition zone and appropriate spacing between an attached rail 12 or 18 and the vehicle surface.

The second end 32 includes ears 50 extending outwardly from the integral sidewall 34 and forming a portion of a rail attachment system. When the support 22 is formed from a metallic stamping, in one preferred embodiment, material has been removed to help facilitate the deformation capability of the ears such that they are somewhat L-shaped with a first short leg 48 being integrally connected to a corresponding sidewall 34 and a second longer leg 49 extending from the first leg 48 and generally longitudinally toward a termination point defining the second end 32.

An adapter component 28, which is most preferably a plug, is received in the second end 32 of rail portion 33 of support 22. The plug 28 includes a male insertion portion 70, a central portion 71 with a greater material cross section as compared to the male insertion portion 70, and a rail engagement portion 72. The male insertion portion 70 of the plug 28 is received within the second end 32 of the rail portion 33 of the support 22 such that it contacts the web 35 and side walls 34.

In the case of a support 22 formed from a metal stamping, the ears 50 are then crimped about an upper surface of the male insertion portion 70 to compressingly retain the plug in position, the ears 50 enveloping an outer surface of the male insertion portion 70. The male insertion portion 70 and second end 32 of the rail portion 33 have mating non-uniform cross sections such as the D-shaped cross section illustrated. However, those practiced in the art will recognize that other non-uniform cross-sections can be utilized in lieu of a D-shaped cross section. The non-uniform cross-section of male insertion portion 70 and second end 32 result in a lack of tendency for the plug 28 to swivel about an axis of rotation within the end 32. Moreover, plug 28 may include a groove 73 and the second end 32 may include a key 75 received in groove 73 to further minimize potential rotational tendencies. If a molded support 22 is used, the nature of the second end 32 and plug 28 may permit a compressive engagement between the two elements through compression of the male insertion portion 70, biased expansion of the second end 32, or a combination of the two. Alternatively, more traditional fastener approaches may be utilized.

FIG. 3 illustrates an alternate configuration support 222 wherein ears 250 engage plug 228. Plug 228 can further include a groove 273 for keying of the rail 12 attached thereto to prevent rail 12 from rotating after installation.

An advantage of using a plug 28 is that it may be easily replaced with a variety of different plugs with different central portions 71 and rail engagement portions 72 without requiring any modifications to second end 32 of the rail portion 33 of the support 22. Typically, plugs 28 are formed from molded plastic.

Alternatively, as illustrated in FIG. 5, a rail 112 may include a male insertion portion 170 and be directly attached to the second end 32 of the rail portion 33 without the need for a plug 28 acting as a transition element. Male insertion portion 170 of rail 112, similar to male portion 70 discussed above, can include a D-shaped cross-section 174 and groove 173 to prevent any rotational movement of rail 112 with respect to support 22.

As noted above, a cover 24 is intended to cover the one-piece support 22. Preferably the cover 24 is made from a molded plastic and may be developed in a wide variety of shapes, to provide support assemblies 20 having a wide variety of different stylistic appearances while using a common support 22, Covers 24 may be customized for different vehicle designs and even exchanged when desired for a particular vehicle. In addition to providing stylistic options to the support assembly, the cover also provides important environmental protection to the stamped support 22 and minimizes the ingress of water and contaminants into the channel 38 of the support.

To facilitate retention between the cover 24 and the support 22, an attachment mechanism 36 is required. The attachment mechanism preferably permits the removal and replacement of the cover 24 as required as well as the substitution of different covers using a common support 22. More preferably, the substitutions may take place even when the support is installed on the vehicle 8.

In the illustrated embodiments, the attachment mechanism 36 associated with the support 22 is a plurality of receiving holes 37 adapted to receive a mating male protrusion 55 such as a deformable tab associated with the cover 24. In alternative embodiments, the base of the web 35 includes a groove 40 at or adjacent to a terminating end 41 of the base portion 31 of the support 22 opposite the rail portion 33. The groove 40 is formed by having a lip 39 protruding outwardly into the channel 38 formed between the web 35 and side walls 34. The groove 40 is adapted to receive a mating tab 56 from the cover 24. Alternatively, in a stamped metal embodiment, as illustrated in FIG. 3, lip 239 can be formed by displacing a portion of web 35 to define therebetween a groove 240 for receiving tab 56. Those practiced in the art will recognize that other friction or snap based approaches may also be used such as having a channel in the cover and a lip in the support that is received in the cover channel, or an opening in the cover 24 male mating protrusions or tabs being associated with the support 22.

In an embodiment of support assembly 20 as further illustrated in FIG. 3, the support 222 is adapted to be permanently secured to a vehicle surface using traditional fastening methods such as screws or bolts. The base portion of the support 222 includes a bottom surface with holes 244 for attachment of the support to an associated vehicle surface using traditional fasteners. Preferably, the bottom surface of support 222 includes one or more pedestals 243 to aid alignment of support assembly 20. The pedestals 243 are received in a cooperating manner with the vehicle surface. For example, if the bottom surface includes a pedestal 243, the vehicle surface includes a mating receptacle to matingly receive the pedestal 243. Proper alignment ensures that the support assembly 20 is properly located with respect to the vehicle surface. The fasteners may be received through the pedestals 243. Pedestals 243 can be formed as dimples as part of the stamping process for a support 222 stamped from metal, or can be formed pedestals 43 for supports 22 that are cast or of composite construction.

To protect the vehicle surface from the support base, as illustrated in FIG. 2, a gasket 26 is preferably disposed between the support base portion 31 and the vehicle surface. The gasket 26 is preferably a relatively soft plastic-like material having a web 60 with a surrounding lip 64 to provide an environment seal around the base portion 31 of support 22. The web 35 of base portion 31 preferably includes openings 46 adapted to receive mating male protrusions 66 formed in the gasket 26 such as in the form of deformable tabs. The tabs 66 associated with the gasket may be generally identical to tabs associated with the cover. As illustrated, the tabs 66 include flexible feet that may be biasedly deformed while passing through the opening 46 of the support 22 and then snapped into position with the periphery of the opening 46 cooperating with grooves in the feet to retain the gasket 26 in a locked position.

For an embodiment of the support assembly associated with a track 16, the support may be deformed to be received in the track 16 directly or to receive an intermediate member to facilitate connection between the support and the track.

In terms of manufacturing, if the support 22 is formed from metal, a sheet of a metal such as steel or aluminum is cut in a first stamping operation to provide an initial template for the support. Through subsequent stamping processes, the support is formed to have the web 35 interposed between the two side walls 34, with the base portion 31 and the rail portion 33, and including the ears 50, openings 36, and any dimpled surfaces 243 and grooves, keys, and the like. Alternatively, an injection molded or die-cast support may be used having the necessary openings and elements. Then, a plug 28 or rail 112 is installed in combination with the second end 32.

In the case of the embodiment wherein the support assembly 20 is directly secured to the vehicle 8 surface, gasket 26 is snapped into place, the support 22 is installed using traditional fasteners, and the cover 24 snapped on to complete the support assembly 20.

In the foregoing description those skilled in the art will readily appreciate that modifications may be made to the invention without departing from the concepts disclosed herein. Such modifications are to be considered as included in the following claims, unless these claims expressly state otherwise.

What is claimed is:

1. A support assembly for use with a vehicle article carrier comprising:
   a one-piece support having a base portion adapted to be selectively proximate a vehicle surface;
   a rail portion remotely spaced from said base portion and said vehicle surface;
   a first attachment mechanism being associated with said support; and
   a cover, said cover having a second attachment mechanism engaging said first attachment mechanism to secure said cover to said support;
   wherein said rail portion includes an ear integral with a sidewall, said ear being deformed into mating engagement with a plug to compressingly retain it within said support.

2. A support assembly as recited in claim 1, wherein said support includes a second sidewall maintained in a spaced relationships said sidewall by a web disposed therebetween, said sidewalls extending upwardly from said web, said sidewalls and said web defining said base portion and said rail portion.

3. A support assembly as recited in claim 1, wherein said support is formed from stamped metal.

4. A support assembly as recited in claim 1, wherein said cover is removably connected to said support.

5. A support assembly as recited in claim 1, wherein said support further comprises a second sidewall and a web disposed between said sidewalls, wherein said sidewalls and said web define a channel and said cover substantially covers said support including closing said channel, thereby protecting said support from environmental conditions.

6. A support assembly as recited in claim 1 further including a gasket affixed to a bottom of said support.

7. A support assembly as recited in claim 1, wherein a plurality of covers of differing shape may be used with a single support.

8. A support assembly as recited in claim 1, wherein said support is stamped metal.

9. A support assembly as recited in claim 1, wherein said support is molded.

10. A support assembly as recited in claim 1, wherein said support is die-cast.

11. A support assembly for use with a vehicle article carrier comprising: a one-piece support having a base portion; a rail portion; a first attachment mechanism being associated with said support; and a cover, said cover having a second attachment mechanism engaging said first attachment mechanism to secure said cover to said support; wherein said first attachment mechanism and said second attachment mechanism comprises at least one of receiving holes and a male protrusion adapted to be received therein; wherein said rail portion includes an ear integral with a side wall of said support, said ear being deformed into mating engagement with a plug to compressingly retain it within said support.

12. A support assembly for use with a vehicle article carrier comprising: a one-piece support having a base portion; a rail portion; a first attachment mechanism being associated with said support; and a cover, said cover having a second attachment mechanism engaging said first attachment mechanism to secure said cover to said support; wherein said first attachment mechanism comprises at least one of a groove and a tab adapted to be matingly engaged therewith; wherein said rail portion includes an ear integral with a side wall of said support, said ear being deformed into mating engagement with a plug to compressingly retain it within said support.

13. A support assembly for use with a vehicle article carrier comprising: a one-piece support having a generally U-shaped cross-section, said U-shape defined by sidewalls and a web extending therebetween, said support having a base portion and a rail portion, wherein said web in said base portion has at least one pedestal extending from a bottom of said U-shape and defining at least one hole therethrough for affixing said support to the vehicle, and further wherein said rail portion is generally angled with respect to said base portion such that an end opposite from said base portion is generally parallel to and spaced from said web of said base portion, said opposite end of said rail portion further including ears; an adapter component received in said opposite end of said rail portion and at least partially retained by said ears and partially retained by said sidewalls and said web; a gasket affixed to a bottom of said support; and a cover extending over said support and engaged thereto; wherein said adapter component is a plug having a non-symmetrical cross-section for preventing rotation of said plug with respect to said support.

14. A support assembly as recited in claim 13, wherein said ears are deformable for engaging said adapter component.

15. A support assembly as recited in claim 13, wherein said adapter component is press fit into said rail portion.

16. A support assembly as recited in claim 13, wherein said gasket defines a central aperture therethrough and further wherein said at least one pedestal extends through said central aperture.

17. A support assembly as recited in claim 13, wherein said cover includes a plurality of male protrusions engaging a plurality of like spaced openings in said sidewalls of said support.

18. A support assembly for use with a vehicle article carrier comprising: a one-piece support having a generally U-shaped cross-section, said U-shape defined by sidewalls and a web extending therebetween, said support having a base portion and a rail portion, wherein said web in said base portion has at least one pedestal extending from a bottom of said U-shape and defining at least one hole therethrough for affixing said support to the vehicle, and further wherein said rail portion is generally angled with respect to said base portion such that an end opposite from said base portion is generally parallel to and spaced from said web of said base portion, said opposite end of said rail portion further including ears; an adapter component received in said opposite end of said rail portion and at least partially retained by said ears and partially retained by said sidewalls and said web; a gasket affixed to a bottom of said support; and a cover extending over said support and engaged thereto; wherein said gasket includes at least one deformable male protrusion engaging openings defined by said web in said base portion.

* * * * *

UNITED STATES PATENT AND TRADEMARK OFFICE
CERTIFICATE OF CORRECTION

PATENT NO. : 7,204,396 B1 Page 1 of 1
APPLICATION NO. : 10/621682
DATED : April 17, 2007
INVENTOR(S) : Craig Stapleton It is certified that error appears in the above-identified patent and that said Letters Patent is hereby corrected as shown below:

Col. 6, line 13, replace "second" with --pair of--.

Col. 6, line 13, replace "sidewall" with --sidewalls--.

Col. 6, line 14, replace "relationships" with --relationship--.

Col. 6, line 14, delete "said sidewall" before "by a web disposed".

Signed and Sealed this

Twenty-third Day of October, 2007

JON W. DUDAS
*Director of the United States Patent and Trademark Office*